United States Patent [19]

Cianciulli et al.

[11] Patent Number: 4,987,731
[45] Date of Patent: Jan. 29, 1991

[54] LEAF RAKE ATTACHMENT

[76] Inventors: Vito Cianciulli; Michael A. Cianciulli, both of 124 Van Guilder Ave., New Rochelle, N.Y. 10801

[21] Appl. No.: 197,545

[22] Filed: May 23, 1988

[51] Int. Cl.5 .............................. A01D 34/63
[52] U.S. Cl. ..................... 56/17.5; 56/16.7
[58] Field of Search ............ 56/16.9, 16.7, 400.01, 56/400.04, 395, 255, 17.5; 37/243, 272, 270, 278, 285

[56] References Cited

U.S. PATENT DOCUMENTS

| | | | |
|---|---|---|---|
| 634,963 | 10/1899 | Smith | 37/285 |
| 2,464,709 | 3/1949 | Orsini | 56/400.04 |
| 3,319,363 | 5/1967 | Kennedy | 37/243 |
| 3,668,845 | 6/1972 | Parker | 56/16.9 |
| 4,541,230 | 9/1985 | Huerter | 56/255 |
| 4,571,861 | 2/1986 | Klever et al. | 37/241 |
| 4,635,429 | 1/1987 | Corwelius | 56/400.01 |

FOREIGN PATENT DOCUMENTS

| | | | |
|---|---|---|---|
| 590028 | 1/1960 | Canada | 56/400.01 |
| 2134362 | 8/1984 | United Kingdom | 56/255 |

OTHER PUBLICATIONS

Polar Sno-Whiz (Implement & Tractor), p. 84.

Primary Examiner—John Weiss
Attorney, Agent, or Firm—Jordan and Hamburg

[57] ABSTRACT

A leaf raking attachment for a conventional lawn mower includes a frame adapted to be releasably mounted to a lawn mower, the frame in turn being adapted to releasably receive a leaf pusher. The frame may be comprised of a welded frame having a pair of spaced apart vertical guide channels, and the leaf pusher may be comprised of a frame covered with iron mesh, and having a pair of vertical guide rods adapted to be received in the guide channels. The side edges of the pusher are curved forwardly in order to enable the attachment to catch and hold a large quantity of leaves.

9 Claims, 3 Drawing Sheets

FIG. 3
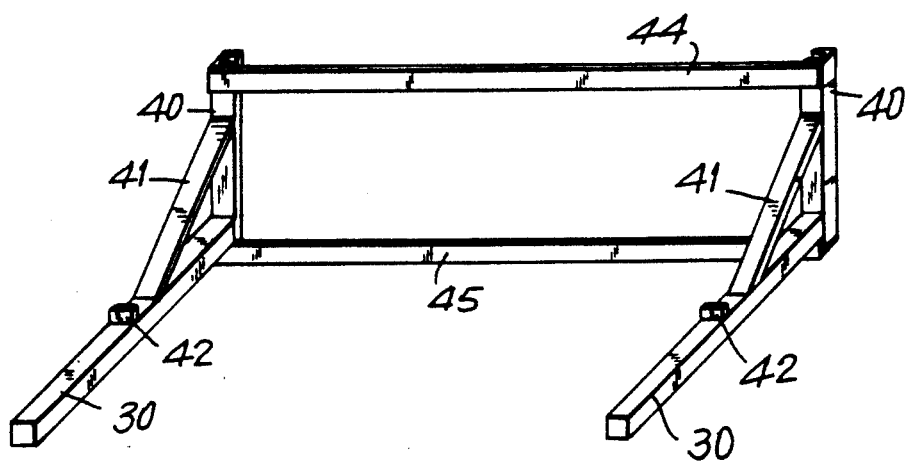
FIG. 4
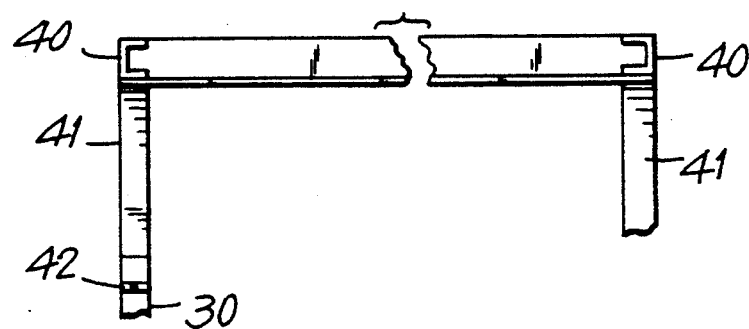
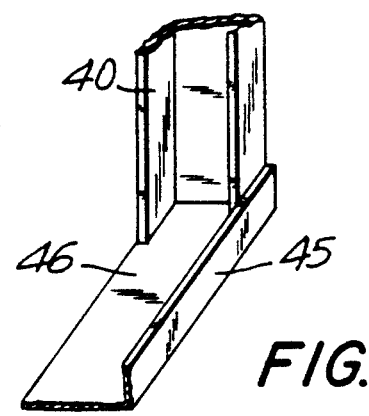
FIG. 5

LEAF RAKE ATTACHMENT

This invention relates to an apparatus especially adapted to raking large quantities of leaves in an economical and labor saving manner, and is more in particular directed to the provision of a leaf raking attachment adaptable to be fit to a conventional lawn treatment apparatus, such as a lawn mower.

BACKGROUND OF THE INVENTION

In the past, the raking of large quantities of leaves, for example on estates, has generally required the manual raking of leaves in local areas onto burlap cloths or the like, with the thus loaded burlap cloths being manually dragged to a curbside for removal by truck. Such manual transporting loads of leaves to the curbside is extremely time consuming, usually requiring a number of persons to complete a leaf removal operation in a reasonable time.

While various raking and other attachments are known, they are not adaptable to the performance of the above described task. Thus, U.S. Pat. No. 2,268,250, Gormley et al, discloses a brush and rake adapted to be driven by a small power unit that is alternatively adapted to drive a lawn mower. U.S. Pat. No. 2,511,642, Law, discloses a wheeled hay rake. U.S. Pat. No. 2,647,356, Adams, discloses a single unit hay rake adapted to be attached to a tractor. U.S. Pat. No. 2,898,724, Robinson, discloses a unitary powered lawn rake adapted to be bolted to a tractor or lawn mower. U.S. Pat. No. 3,417,554, Sudhoff, discloses a single unit power rake for removing thatch from grass. U.S. Pat. No. 3,436,847; Grimes, discloses a snow plow adapted to be attached to a tractor. U.S. Pat. No. 3,789,590, Wilson, discloses a unitary powered rake. U.S. Pat. No. 4,130,952, Dion, discloses a plow adapted to be attached to a tiller. U.S. Pat. No. 4,322,936, Whitney, discloses a unitary powered raking device with a rake intermediate the front and rear wheels.

In spite of the knowledge of such devices for many years, the current practice in raking leaves has remained as I have discussed above.

SUMMARY OF THE INVENTION

The present invention is directed to the provision of an apparatus that overcomes the disadvantages of the prior techniques involved in the raking of leaves.

Briefly stated, in accordance with the invention, I provide a leaf raking attachment for a conventional lawn treatment apparatus, such as a lawn mower. Lawn mowers of sufficient power are readily available, especially to persons expected to be involved in commercial leaf raking operations, and such lawn mowers are usually available for productive work at the locations at which it is necessary to dispose of fallen leaves. The leaf raking attachment includes a frame adapted to be releasably mounted to a lawn mower, the frame in turn being adapted to releasably receive a leaf pusher.

Advantageously the frame is comprised of a welded frame having a pair of spaced apart vertical guide channels, the leaf pusher being comprised of a frame covered with iron mesh, and having a pair of vertical guide rods adapted to be received in the guide channels. The side edges of the pusher are curved forwardly in order to enable the attachment to catch and hold a large quantity of leaves.

BRIEF DESCRIPTION OF THE DRAWING

In order that the invention may be more clearly understood, it will now be disclosed in greater detail with reference to the accompanying drawing, wherein:

FIG. 3 is a rear perspective view of the frame;

FIG. 4 is a top view of a portion of the frame;

FIG. 5 is an enlarged perspective view of a portion of the frame;

DETAILED DISCLOSURE OF THE INVENTION

Figure 1:
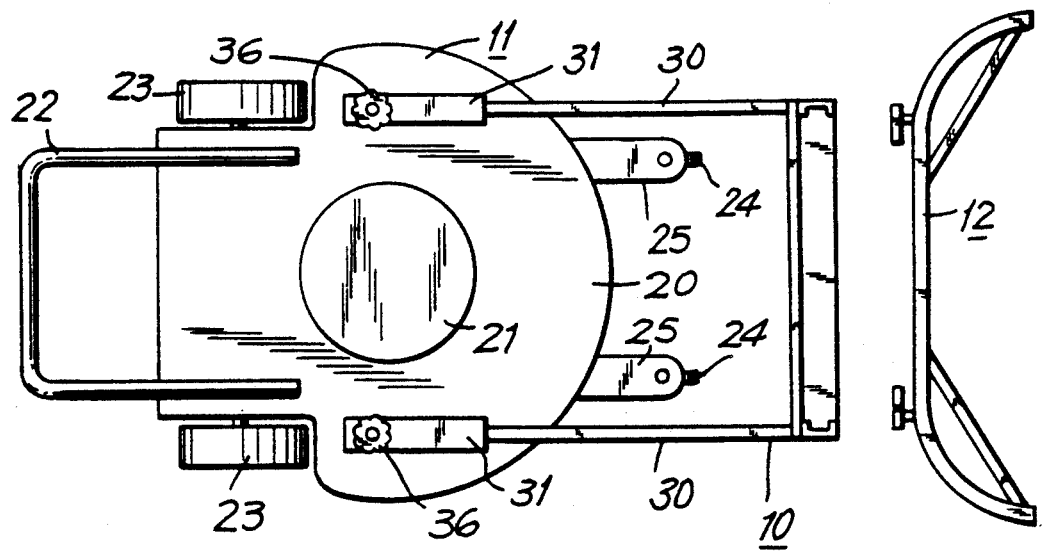
FIG. 1 is a top view of a leaf pushing attachment in accordance with the invention, affixed to a conventional lawn mower, with the pusher thereof not mounted to the frame.
Figure 2:
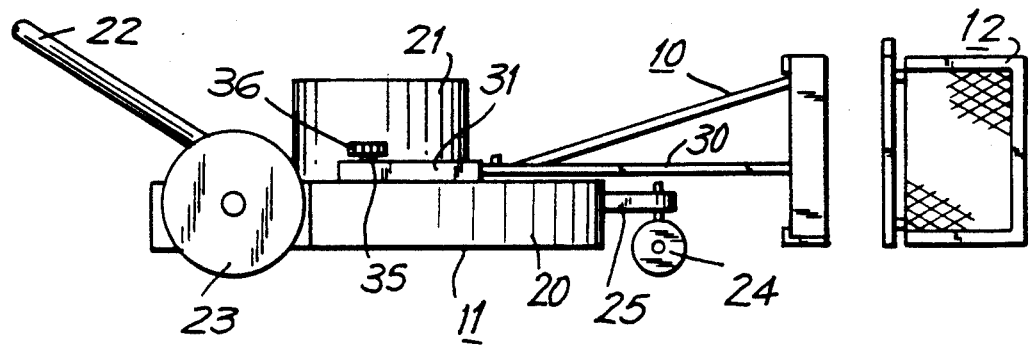
FIG. 2 is a side view of the arrangement of FIG. 1.

Referring now to the drawings, and in particular to FIGS. 1 and 2, therein is illustrated a leaf raking attachment in accordance with the invention with the frame 10 thereof mounted to a lawn mower 11, and the leaf pusher 12 of the attachment separate from the frame 10.

The lawn mower 11 illustrated is a conventional rotary power lawn motor, having a frame 20 supporting a motor 21, an operator controlled handle 22, powered rear wheels 23 and front wheels 24 mounted to supports 25 to have adjustable heights. The illustrated lawn motor depicted in FIG. 1 is purely illustrative, and the invention is not limited for use on this particular type of lawn mower, the invention being equally adaptable for use with reel type mowers, sickle bar mowers, riding mowers, tractors, etc., as well as other powered lawn treatment devices. It may be considered necessary, however, that the lawn mower have powered wheels in order to be able to push the leaf pushing attachment of the invention.

In accordance with the preferred embodiment of the invention, the frame 10 of the leaf pusher is mounted to the frame of the lawn mower for easy assembly to the mower and disassembly therefrom. For this purpose, the frame 10 has a pair of parallel rearwardly extending mounting rods 30, for example of one inch square steel rods, the rods 30 extending from the front of the mower into channels 31 affixed to the top of the frame 20 of the mower, for example by welding, with the webs of the channels defining the tops thereof. It is of course apparent that other techniques may be employed for providing mounting fixtures on the mower for receiving and holding the mounting rods 30. The channels 31 each have a threaded hole in its web for receiving threaded shafts 35, the upper ends of the shafts having handles 36 to facilitate the screwing of the shafts 35 downwardly onto the rods 30, thereby to releasably hold the rods 30 in the channels 31.

As illustrated in FIGS. 3-5, in the preferred embodiment of the frame in accordance with the invention, the rods 30 are generally horizontal (when in use) and their front ends are affixed to upright guide channels 40, the channels being spaced apart in the direction transverse to the apparatus and the open sides of the channels 40 being arranged to face one another. Angle supports 41 are provided extending from the upper ends of the channels 40 to the support rods 30 to maintain the rigidity of the frame. The angle supports 41 may be formed from angle iron. A projection 42 is affixed to the top of each support rod 30, rearwardly of the joint thereof to the angle supports 41, to serve as stops against the mounting channels 30 when the frame 10 is being installed, thereby readily enabling the frame 10 to be mounted to the proper position to the mower.

The guide channels 40 are held together by an upper transverse member 44 and a lower transverse member 45. The upper member 44 may be a steel strip affixed to the rear of the channels 40, and the lower member may be an angle iron having one leg 46 thereof extending horizontally across the bottoms of the channels 40 to provide a bottom support, as more clearly seen in FIG. 5.

The elements of the frame 10 may conveniently be welded together. It is of course apparent that the invention is not limited to the specific form of the frame 10, as illustrated, and that it may alternatively be constructed in many other different configurations. It is primarily necessary, however, that the frame be configured to be readily mounted to and disassembled from the lawn mower, and that it be configured to facilitate the assembly of the leaf pusher 12 thereto, and the disassembly of the leaf pusher 12 therefrom. The frame 10 should be relatively rigid, as well as relatively light, sufficiently light for example that the operator will not have difficulty in adjusting the height of the front wheels of the mower while the frame 10 is attached to the mower.

Figure 6:
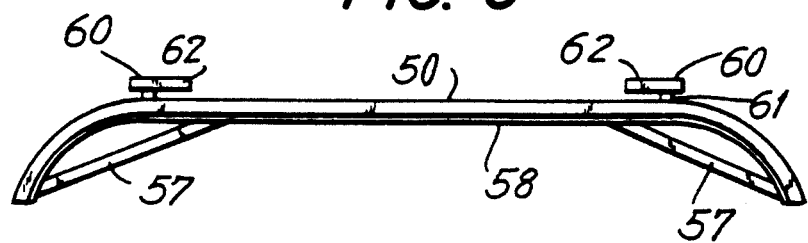
FIG. 6 is a top view of the pusher.
Figure 7:
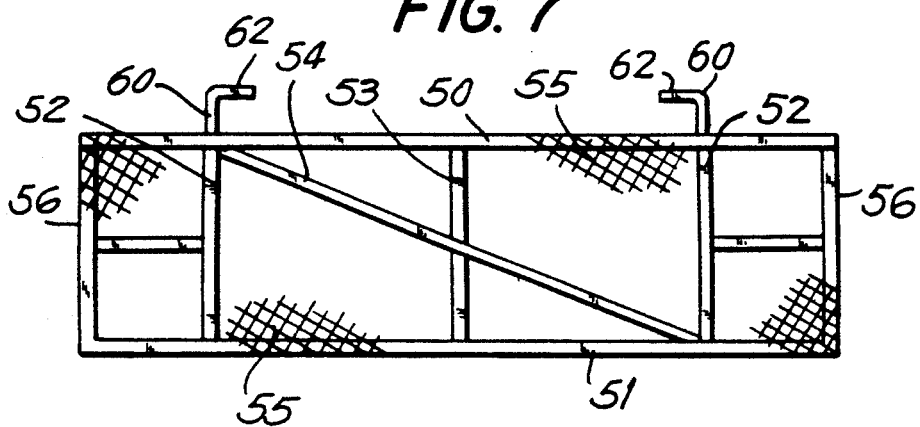
FIG. 7 is a front view of the pusher.
Figure 8:
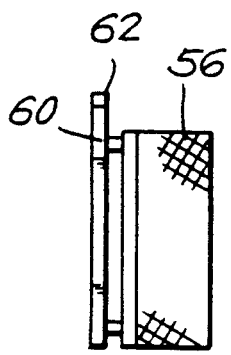
FIG. 8 is a side view of the pusher.

The preferred embodiment of the leaf pusher 12 is illustrated in FIGS. 6–8. As illustrated, the pusher 12 has a central planar frame defined by upper member 50 and lower frame member 51 joined by vertical frame members 52. Further vertical supports such as support 53, diagonal supports such as support 54, etc., may be provided for rigidity and to provide backing as necessary for the mesh 55 covering the front of the pusher 12. A curved frame section 56, preferably having a vertical axis of curvature, is affixed to each side of the central planar frame, the curved frame sections extending forwardly at their free ends to inhibit leaves pushed by the pusher from being pushed sidewardly as the pusher is pushed forwardly. The curved frame sections 56 are also covered with the mesh 55, and suitable support vertical, horizontal and diagonal supports may also be provided in these frame sections where necessary for rigidity and to provide backing for the mesh. Top angle supports 57 may be provided extending from the free ends of the curved frame sections to the central planar frame, for strength.

Figure 9:
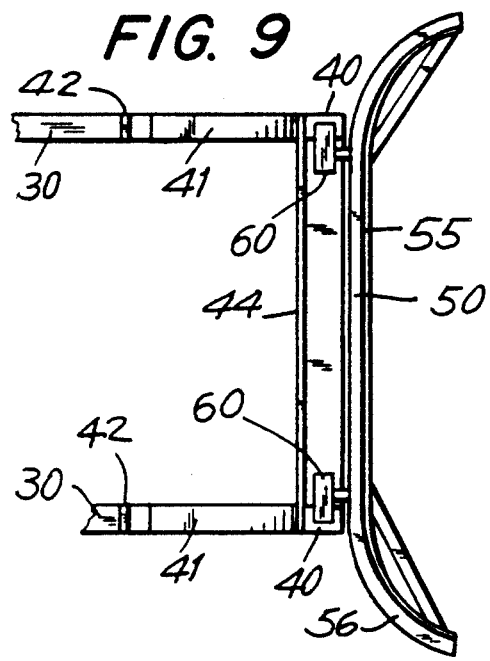
FIG. 9 is a top view of the pusher and a portion of the frame, assembled together.

A pair of vertical guide rods 60 are mounted to the rear of the pusher 12, horizontally spaced apart a distance to enable the guide rods 60 to be received and held in the guide channels 40 of the frame 10, as illustrated in FIG. 9. The guide rods may be affixed to the rear of the central planar frame of the pusher by any convenient means, for example being spaced therefrom by supports 61 to enable the guide rods 60 to easily slide vertically in the guide channels 40. The guide rods 60 may have a height greater that the front portion of the pusher 12, and be bent to form handles 62 to facilitate lifting of the pusher 12 for assembly and disassembly. It is of course apparent that other techniques may be employed for providing handles on the pusher 12.

The pusher 12 may be formed of angle iron and strip iron, and the mesh 55 may be expanded steel sheet, the components being welded together. It is preferred that the covering of the frames of the pusher be open, as the above discussed mesh, in order to minimize weight and to permit the operator a clearer view of the leaf raking operation, but it is possible that a sheet metal may be alternatively be employed for this function, or that other materials may be employed. It is of course apparent that the pusher 12 may be formed in different manners and with different materials. It is of course necessary, however, that it have sufficient rigidity and strength to be able to push large quantities of leaves, which may be quite heavy if they are wet, without deformation.

In one embodiment of the invention, the pusher 12 had a height of 21 inches, exclusive of the handles, and a width of 64 inches. The frame 10 had a height of 17 inches and a width of 46 inches. The supports rods 30 had lengths of 32 inches. It is of course apparent that these dimensions are purely illustrative, and not in any way limiting of the invention.

As above discussed, the frame 10 of the leaf pushing attachment of the invention is sufficiently light that its removal from the lawn mower is not necessary in order to enable the adjustment of the height of the front of the lawn mower, although the additional weight of the pusher 12 on the frame 10 may render such adjustment difficult. Adjustment of the height is advantageous in order to adapt the height of the attachment for the task at hand. Thus, when the leaves are being pushed across a grassy lawn or the like, the front of the lawn mower is preferably raised. On the other hand, when the leaves are to be pushed along a paved driveway or sidewalk, the front of the lawn mower is preferably lowered so that the frame 10 just clears the pavement, in order to enable the leaf pushing operation to be more efficient. This adjustment is facilitated, in accordance with the invention, since the relatively heavy pusher 12 is readily removable from the frame 10.

In a typical use of the leaf pushing attachment of the invention, one person may handle the lawn mower with the leaf raking attachment thereon, while another person, using a leaf blower, blows leaves into an elongated pile, or at least to a more dense accumulation. The lawn mower operator may then readily push such accumulations into larger piles, if the expanse to be covered is great, for later pushing directly to the curbside or forming of still larger piles. It has been found that, since a powered lawn mower is employed for the pushing energy, the task of pushing the leaves to the curbside is effected in a much more rapid manner, and with considerably less effort, than in the prior technique, and that fewer personnel may be required for the operation. These advantages are attained even though the leaves may be wet, a condition that renders the prior technique especially difficult or not feasible.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A leaf raking attachment for a powered lawn treatment apparatus having a front, comprising a frame and a leaf pusher,
    said frame comprising means for releasably holding said frame to the forwardly of a lawn treatment apparatus,
    said pusher comprising a generally planar central portion and forwardly curved side portions, and means for releasably holding said pusher to said frame and forwardly thereof, said means for releasably holding said pusher comprising a pair of horizontally spaced apart vertical guide channels on said frame and a pair of vertical guide rods on said pusher adapted to be guided in said guide channels.

2. A leaf raking apparatus comprising a powered lawn treatment apparatus having a front, a first frame and power driven wheels, a second frame and means for releasably mounting said second frame forwardly of said first frame, a leaf pusher, and means for releasably mounting said leaf pusher forwardly of said second frame, said second frame comprising a pair of vertical guide channels spaced apart in the transverse direction of said leaf raking apparatus, and stop means at the bottoms of said channels, and said means for releasably holding said leaf pusher comprising a pair of vertical guide rods mounted on the rear of said leaf pusher and mounted to be slidably guided in said channels.

3. The leaf raking apparatus of claim 2 further comprising handles at the upper ends of said guide rods.

4. The leaf raking apparatus of claim 2 wherein said leaf pusher comprises a generally vertical planar central portion and a curved portion mounted at each side of said central portion, said curved portions having vertical axes of curvature.

5. The leaf raking apparatus of claim 4 wherein said leaf pusher further comprises mesh material covering the front of said central and curved portions.

6. The leaf raking apparatus of claim 5 wherein said central and curved portions comprise frames covered with said mesh.

7. A leaf raking attachment for a powered lawn treatment apparatus having a front, comprising a frame and a leaf pusher,
said frame comprising means for releasably holding said frame to the forwardly of a lawn treatment apparatus,
said pusher comprising a generally planar central portion and forwardly curved side portions, and means for releasably holding said pusher to said frame and forwardly thereof, said frame further comprising a pair of vertical spaced apart channels, a rod extending rearwardly from each channel, and an upper and a lower support extending between said channels, said lower support extending below said channels to form a lower stop for said means for releasably holding said pusher.

8. The attachment of claim 7 further comprising lifting means on said pusher to enable manual lifting thereof.

9. A leaf raking attachment for a powered lawn treatment apparatus having a front, comprising a frame and a leaf pusher,
said frame comprising means for releasably holding said frame to the forwardly of a lawn treatment apparatus,
said pusher comprising a generally planar central portion and forwardly curved side portions, and means for releasably holding said pusher to said frame and forwardly thereof, said central planar portion comprising a first frame and said forwardly curved side portions comprising side frames having a generally vertical axis of curvature, and further comprising a mesh covering the front of said first frame and said side frames.

* * * * *